(12) United States Patent
Sun et al.

(10) Patent No.: US 9,166,689 B2
(45) Date of Patent: Oct. 20, 2015

(54) EQUALIZATION MECHANISM FOR PROCESSING TRAFFIC BASED ON THREE-QUADRATURE AMPLITUDE MODULATION (3QAM)

(75) Inventors: Han Henry Sun, Ottawa (CA); Kuang-Tsan Wu, Kanata (CA); Pierre Mertz, Baltimore, MD (US)

(73) Assignee: Infinera Corporation, Sunnyvale, CA (US)

( * ) Notice: Subject to any disclaimer, the term of this patent is extended or adjusted under 35 U.S.C. 154(b) by 396 days.

(21) Appl. No.: 13/536,291

(22) Filed: Jun. 28, 2012

(65) Prior Publication Data

US 2014/0003824 A1 Jan. 2, 2014

(51) Int. Cl.
*H04B 10/00* (2013.01)
*H04B 10/2507* (2013.01)
*H04B 10/532* (2013.01)
*H04B 10/54* (2013.01)
*H04B 10/61* (2013.01)

(52) U.S. Cl.
CPC ........ *H04B 10/25073* (2013.01); *H04B 10/532* (2013.01); *H04B 10/541* (2013.01); *H04B 10/616* (2013.01)

(58) Field of Classification Search
CPC .................... H04B 10/5561; H04B 10/25073; H04B 10/532; H04B 10/541; H04B 10/612; H04B 10/616; H04J 14/06; H04L 27/38; H04L 27/223
USPC ......... 398/202–205, 208, 210, 188, 149, 140, 398/152, 158, 161, 186, 154
See application file for complete search history.

(56) References Cited

U.S. PATENT DOCUMENTS

| | | | |
|---|---|---|---|
| 5,511,096 A * | 4/1996 | Huang et al. .................. 375/265 |
| 7,711,273 B2 * | 5/2010 | Koc .............................. 398/202 |
| 8,131,148 B2 * | 3/2012 | Sun et al. ........................ 398/25 |
| 8,265,489 B2 * | 9/2012 | Kikuchi ........................ 398/189 |
| 8,682,181 B2 * | 3/2014 | Liu et al. ....................... 398/205 |
| 8,849,125 B2 * | 9/2014 | Sun et al. ...................... 398/140 |
| 2003/0184458 A1 * | 10/2003 | Calvignac et al. ............ 341/102 |
| 2004/0028412 A1 * | 2/2004 | Murphy ........................ 398/135 |

(Continued)

OTHER PUBLICATIONS

D. S. Millar et al.: "Blind adaptive equalization of polarization-switched QPSK modulation", Optics Express, vol. 19, No. 9, Apr. 2011, pp. 8533-8538.

(Continued)

*Primary Examiner* — Hibret Woldekidan
(74) *Attorney, Agent, or Firm* — Harrity & Harrity LLP; David L. Soltz

(57) ABSTRACT

A system receives four-bit symbols that correspond to traffic associated with a three-bit phase modulation scheme and are encoded based on a four-bit phase modulation scheme. The system determines values with which to perform equalization that enable the four-bit symbols to be restored to a condition that existed prior to being transmitted to the system. The system performs, using the values, equalization on a four-bit symbol that includes at least a first pair of bits associated with a first polarization, and performs, after completing the equalization, another equalization on another four-bit symbol that includes at least a second pair of bits associated with a second polarization. The system identifies a three-bit symbol, of a set of three-bit symbols associated with the three-bit phase modulation scheme, based on the equalized first pair of bits and the equalized second pair of bits, generates the three-bit symbol, and outputs the three-bit symbol.

25 Claims, 9 Drawing Sheets

(56) References Cited

U.S. PATENT DOCUMENTS

| | | | |
|---|---|---|---|
| 2004/0197103 A1* | 10/2004 | Roberts et al. | 398/159 |
| 2010/0142964 A1* | 6/2010 | Chang et al. | 398/116 |
| 2010/0178065 A1* | 7/2010 | Nishihara et al. | 398/202 |
| 2012/0224852 A1* | 9/2012 | Liu et al. | 398/65 |
| 2013/0259490 A1* | 10/2013 | Malouin et al. | 398/152 |
| 2014/0003814 A1* | 1/2014 | Sun et al. | 398/65 |

OTHER PUBLICATIONS

"Jones calculus" From Wikipedia, the free encyclopedia; retrieved online at: http://en.wikipedia.org/wiki/Jones_calculus, print date May 10, 2012, 8 pages.

P. Poggiolini et al.: "Performance evaluation of coherent WDM PS-QPSK (HEXA) accounting for non-linear fiber propagation effects", Optics Express, vol. 18, No. 11, May 24, 2010, pp. 11360-11371.

M. K. Simon et al.: "On the Optimality of Classical Coherent Receivers of Differentially Encoded M-PSK", IEEE Communications Letters, vol. 1, No. 3, May 1997, pp. 67-70.

G. Bosco et al.: "Performance Evaluation of Coherent PS-QPSK (HEXA) Modulation", Optical Society of America, 2011, 2 pages.

E. Agrell et al.: "Power-Efficient Modulation Formats in Coherent Transmission Systems", Journal of Lightwave Technology, vol. 27, No. 22, Nov. 15, 2009, pp. 5115-5126.

\* cited by examiner

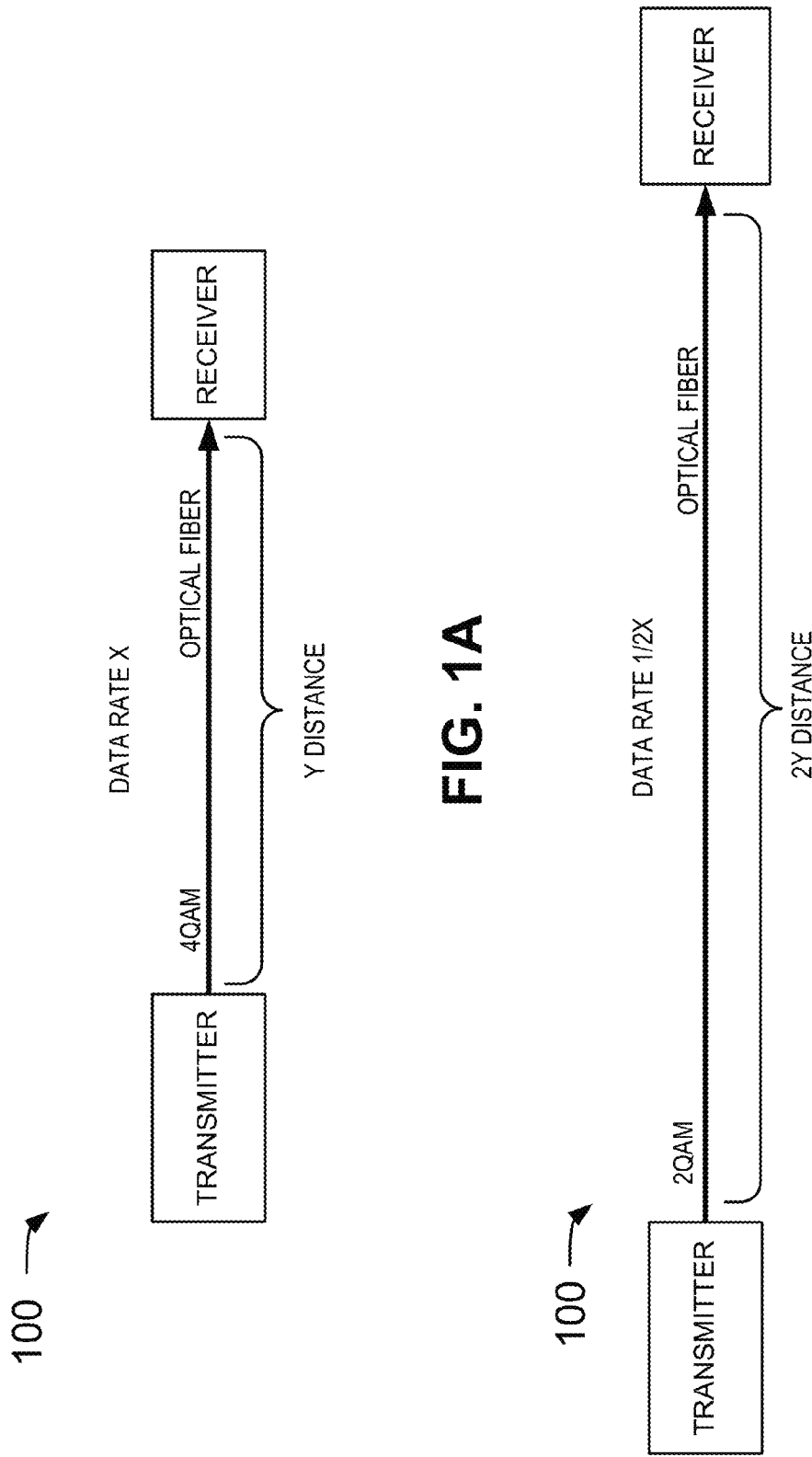

FIG. 3

| 3QAM Symbol 305 | X POL / IN-PHASE BIT 310 | X POL / QUAD BIT 315 | Y POL / IN-PHASE BIT 320 | Y POL / QUAD BIT 325 |
|---|---|---|---|---|
| 000 | -1 | -1 | -1 | -1 |
| 001 | -1 | -1 | -1 | 1 |
| 010 | -1 | -1 | 1 | -1 |
| 011 | -1 | -1 | 1 | 1 |
| 100 | -1 | 1 | -1 | -1 |
| 101 | 1 | -1 | -1 | -1 |
| 110 | 1 | 1 | -1 | -1 |
| 111 | 1 | 1 | 1 | 1 |

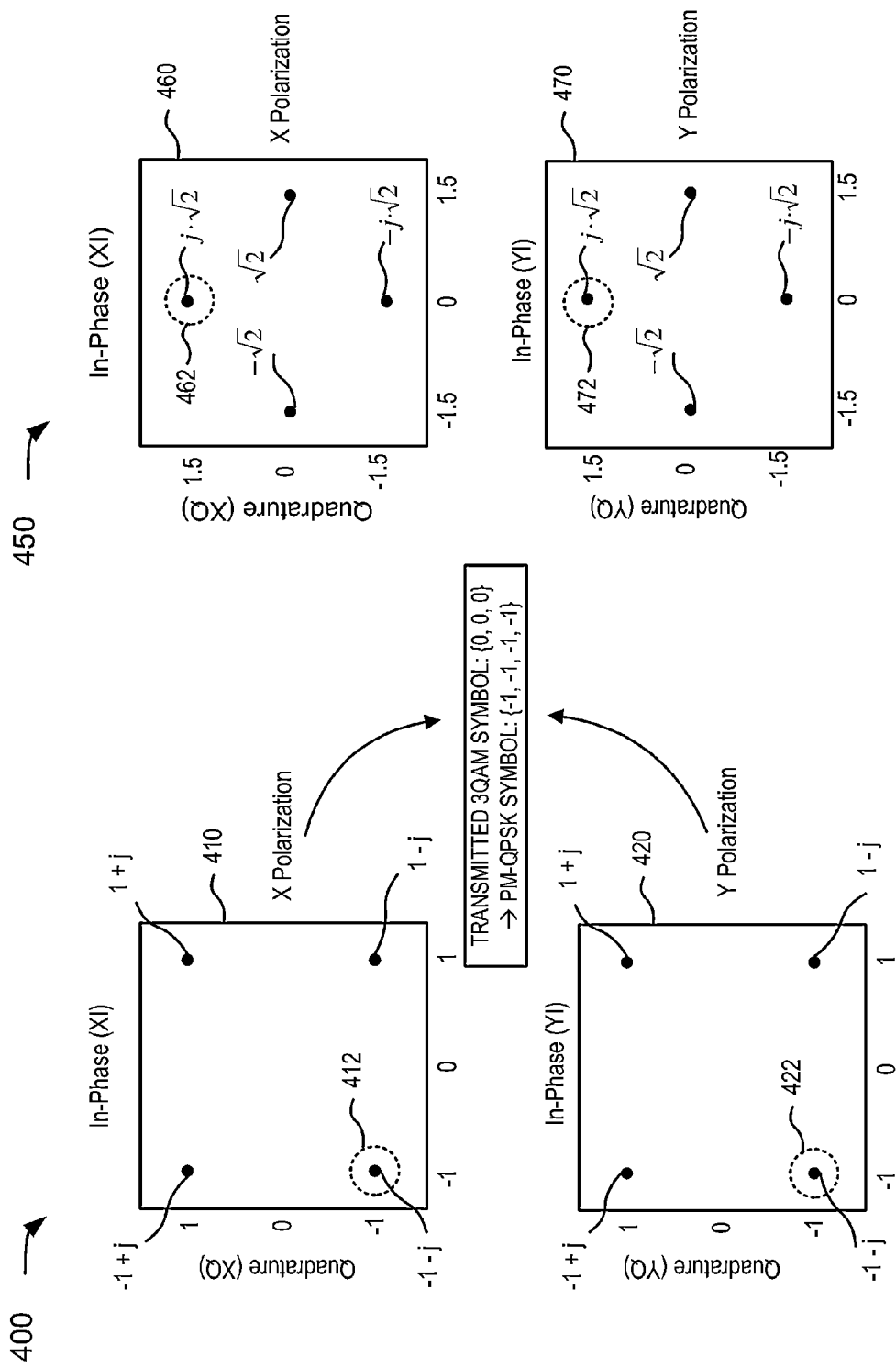

EQUALIZATION MECHANISM FOR PROCESSING TRAFFIC BASED ON THREE-QUADRATURE AMPLITUDE MODULATION (3QAM)

BACKGROUND

Coherent optical receivers process traffic, in the form of optical signals, received from an optical network. Coherent optical receivers process the optical signals by performing operations on the optical signals, such as polarization beam splitting, demodulation, analog-to-digital conversion, equalization, etc.

The coherent optical receivers may use different modulation techniques (e.g., phase shift keying, frequency modulation, etc.) to process traffic received from the optical network. Examples of common phase shift keying techniques include polarization multiplexed (PM) binary phase shift keying (PM-BPSK), and PM-quadrature phase shift keying (PM-QPSK) (sometimes referred to as "four-quadrature amplitude modulation (4QAM)"). PM-BPSK uses two bits to represent a dual-polarized symbol and PM-QPSK uses four bits to represent a dual-polarized symbol. Recently, another phase shift keying technique has emerged that represents a hybrid of the PM-BPSK and PM-QPSK techniques (sometimes referred to as "three-quadrature amplitude modulation (3QAM)" or "HEXA"). 3QAM uses three bits to represent a dual-polarized symbol. Unfortunately, coherent optical receivers, that process PM-QPSK and/or PM-BPSK traffic cannot process 3QAM traffic without incurring false locks that cause catastrophic bit error rates and/or a disruption of service.

SUMMARY

According to one implementation, a method may include receiving, by a receiver device, traffic associated with a three-bit phase modulation scheme. The traffic may include a group of four-bit symbols and the group of four-bit symbols may be encoded using a four-bit phase modulation scheme. The method may also include obtaining, by the receiver device and from the traffic, a first symbol of the group of four-bit symbols. The first symbol may include at least a first pair of bits and the first pair of bits may correspond to a first polarization. The method may further include performing, by the receiver device, a first equalization on the first pair of bits. The first equalization may restore the first pair of bits to a condition that existed before the first pair of bits were transmitted to the network receiver device. The method may yet further include obtaining, by the receiver device and from the traffic, a second symbol of the group of four-bit symbols based on performing the first equalization. The second symbol may include at least a second pair of bits. The second pair of bits may correspond to a second polarization and may be delayed, for a time period, relative to the first pair of bits. The method may still further include performing, by the receiver device and after at least the time period from when the first equalization is initiated, a second equalization on the second pair of bits. The second equalization may restore the second pair of bits to a condition that existed before the second pair of bits were transmitted to the receiver device. The method may also include identifying, by the receiver device, a three-bit symbol that corresponds to the equalized first pair of bits and the equalized second pair of bits, the three-bit symbol may correspond to the three-bit phase modulation scheme; and outputting, by the receiver device, the three-bit symbol.

According to another implementation, a system may include an equalizer device to: receive four-bit symbols. The four-bit symbols may correspond to traffic associated with a three-quadrature amplitude modulation (3QAM) scheme and may be encoded using a polarization multiplexed-quadrature phase shift keying (PM-QPSK) modulation scheme. The equalizer device is also to perform, based on receiving the four-bit symbols, a first equalization on a first symbol, of the four-bit symbols. The first symbol may include at least a first pair of bits and the first pair of bits may correspond to a first polarization. The equalizer device is further to perform, after at least a first time period from when the first equalization is initiated, a second equalization on a second symbol, of the four-bit symbols. The first time period may be greater than a second time period during which the first initialization is performed. The second symbol may include at least a second pair of bits and the second pair of bits may correspond to a second polarization. The equalizer device is still further to output the equalized first pair of bits and the equalized second pair of bits. The system may also include a decoder device to receive the equalized first pair of bits and the equalized second pair of bits; and identify a three-bit symbol, of a set of three-bit symbols, that corresponds to a third symbol, of a set of four-bit symbols, the third symbol corresponding to the equalized first pair of bits and the equalized second pair of bits. The set of three-bit symbols may correspond to the 3QAM scheme and the set of four-bit symbols may correspond to the PM-QPSK modulation scheme. The decoder device is also to generate the identified three-bit symbol; and output the generated three-bit symbol.

According to a further implementation, a receiver device may include one or more processors to: receive four-bit symbols. The four-bit symbols may correspond to traffic associated with a three-bit phase modulation scheme and may be encoded based on a four-bit phase modulation scheme. The one or more processors are further to determine, based on receiving the four-bit symbols, one or more values with which to perform equalization that enables the four-bit symbols to be restored to a condition that existed prior to being transmitted to the receiver device; and perform, using the one or more values, a first equalization on a first symbol, of the four-bit symbols. The first symbol may include at least a first pair of bits associated with a first polarization. The one or more processors are yet further to perform, after completing the first equalization on the first symbol, a second equalization on a second symbol, of the four-bit symbols. The second symbol may include at least a pair of second bits associated with a second polarization. The one or more processors are still further to identify a three-bit symbol, of a set of three-bit symbols, that corresponds to a third symbol, of a set of four-bit symbols, the third symbol corresponding to the equalized first pair of bits and the equalized second pair of bits. The set of three-bit symbols may correspond to the three-bit phase modulation scheme and the set of four-bit symbols may correspond to the four-bit phase modulation scheme. The one or more processors are also to generate the identified three-bit symbol; and output the generated three-bit symbol.

According to another implementation, an optical transmitter may include one or more processors to receive a three-bit symbol associated with a three-bit phase modulation scheme; and identify, based on receiving the three-bit symbol, a first four-bit symbol, of a set of four-bit symbols, that corresponds to the three-bit symbol. The set of four-bit symbols may correspond to a four-bit phase modulation scheme. The one or more processors are further to: generate the first four-bit symbol that corresponds to the three-bit symbol; and identify, based on the first four-bit symbol, a first pair of bits and a second pair of bits. The first pair of bits may correspond to a first polarization and the second pair of bits may correspond to a second polarization. The one or more processors are further to associate the first pair of bits with a third pair of bits to create a second four-bit symbol that corresponds to the four-bit phase modulation scheme. The third pair of bits may correspond to the second polarization. The one or more processors are still further to: output the second four-bit symbol; and associate, based on outputting the second four-bit symbol and after a time period from when the first pair of bits were associated with the third pair of bits, the second pair of bits with a fourth pair of bits to create a third four-bit symbol that corresponds to the four-bit phase modulation scheme. The fourth pair of bits may correspond to the first polarization. The one or more processors are further to output the third four-bit symbol.

According to a further implementation, an optical receiver device may include one or more components to: receive traffic that includes four-bit symbols. The four-bit symbols may be encoded using a four-bit phase modulation scheme, The one or more components may also be to process the traffic to recover the four-bit symbols. The recovered four-bit symbols may be restored to a condition that existed before the four-bit symbols were transmitted to the optical receiver device. The one or more components may also be to decode the recovered four-bit symbol to obtain three-bit symbols, the three-bit symbols may be associated with a three-quadrature amplitude modulation (3QAM) scheme; and output the traffic based on the three-bit symbols.

BRIEF DESCRIPTION OF THE DRAWINGS

FIGS. 1A and 1B are diagrams illustrating an example coherent optical system;

FIG. 3 is a diagram of an example data structure that stores information that associates three-bit 3QAM symbols with four-bit PM-QPSK symbols;

FIGS. 4A-4C are diagrams of example modulation states associated with four-bit symbols being processed by an optical receiver of FIG. 2;

DETAILED DESCRIPTION

Figure 1C:
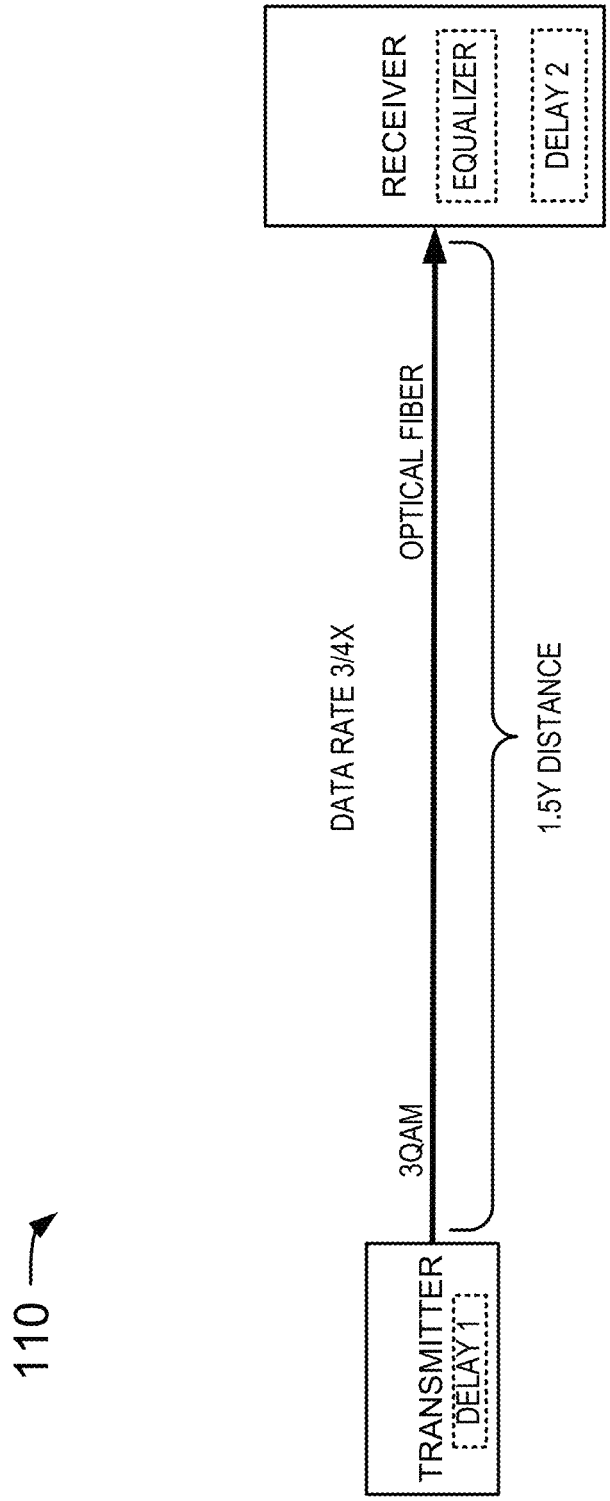
FIG. 1C is a diagram illustrating an overview of an example implementation described herein.

The following detailed description refers to the accompanying drawings. The same reference numbers in different drawings may identify the same or similar elements.

Systems and/or methods, in an example implementation described herein, may enable traffic, associated with three-quadrature amplitude modulation (3QAM), to be processed by a coherent optical system that handles traffic associated with a polarization multiplexed-quadrature phase shift keying (PM-QPSK) modulation. Enabling the coherent optical system to process the 3QAM traffic may permit the coherent optical system to continue to process traffic, using 3QAM techniques, when sufficient system margin is not available to process traffic using PM-QPSK modulation techniques. Additionally, or alternatively, processing traffic, using the 3QAM techniques, may permit the coherent optical system to continue to process the traffic at a higher throughput than when processing traffic using PM-binary phase shift keying (PM-BPSK) modulation techniques.

FIGS. 1A and 1B are diagrams illustrating an example coherent optical system 100. As illustrated in FIG. 1A, system 100 may enable traffic, based on PM-QPSK modulation techniques (hereinafter referred to as "PM-QPSK traffic"), to be transmitted between a coherent optical transmitter (e.g., shown as "transmitter") and a coherent optical receiver (e.g., shown as "receiver"). The PM-QPSK traffic may be transmitted over an optical fiber for a first distance (e.g., Y Distance) and may include a first data rate (e.g., data rate X, such as a bit rate, a symbol rate, etc.). The first distance, over which the PM-QPSK traffic is transmitted, may be limited based on noise and/or imperfections in the optical fiber that cause signal quality to degrade. The PM-QPSK traffic may, for example, be based on four-bit dual-polarized symbols that correspond to a first polarization (e.g., a Transverse Electric (TE) polarization or some other first polarization) (hereinafter referred to as "X polarization") and a second polarization (e.g., a transverse magnetic (TM) polarization or some other second polarization) (hereinafter referred to as "Y polarization"). The four bits may, in one example, correspond to a payload bit and three bits associated with error correction and/or identification.

As illustrated in FIG. 1B, system 100 may enable traffic to be transmitted between the coherent optical transmitter and the coherent optical receiver using PM-BPSK modulation techniques (hereinafter referred to as "PM-BPSK traffic"). The PM-BPSK traffic may, for example, be transmitted over a second distance that is greater than the first distance and/or at a second data rate (e.g., data rate ½X) that is less than the first data rate. In one example, the second distance may be approximately twice as far (e.g., shown 2Y distance) as the first distance associated with the PM-QPSK traffic. The second distance may be greater than the first distance due to the PM-BPSK traffic being more tolerant of noise and/or imperfections within the optical fiber. Additionally, the PM-BPSK traffic may include two bits per dual-polarized symbol which may cause the second data rate to be less than the first data rate. The two bits may, for example, correspond to a payload bit and/or a bit associated with error correction and/or identification. In one example, the second data rate may be approximately half of the first data rate (e.g., due to the two bits per PM-BPSK symbol being half of the four bits per PM-QPSK symbol).

In one example, system 100 may determine that sufficient system margin may not be available to transport the PM-QPSK traffic. When sufficient system margin is no longer available to transport the PM-QPSK traffic, system 100 may transport traffic using the PM-BPSK signal. System margin may, for example, correspond to an amount of noise tolerance of system 100. The noise tolerance may identify a quantity of additional noise that can be tolerated, by system 100, before errors are created in the traffic. When the quantity of errors (e.g., base on a bit error rate, a symbol error rate, etc.) is greater than a threshold, data may be lost, traffic may not be processed, and/or a service disruption may occur.

System 100 may transport the PM-BPSK signal at a data rate that is less than a data rate associated with the PM-QPSK signal. Thus, transporting the traffic using the PM-BPSK signal at the lower data rate, may enable system 100 to continue to transport traffic.

FIG. 1C is a diagram illustrating an overview of an example implementation 110 described herein. As illustrated in FIG. 1C, example implementation 110 may enable a coherent optical system to transport traffic using 3QAM techniques (hereinafter referred to as "3QAM traffic"). The 3QAM traffic may, for example, be transmitted over a third distance that is greater than the first distance associated with the PM-QPSK traffic and less than the second distance associated with the PM-BPSK traffic. In one example, the third distance may be approximately one and one-half as far (e.g., shown 1.5Y distance) as the first distance and three-fourths as far as the second distance. The third distance may be greater than the first distance due to the 3QAM traffic being more tolerant of noise and/or imperfections within the optical fiber than the PM-QPSK traffic (e.g., due to 3QAM data rate being less than PM-QPSK data rate). The third distance also, or alternatively, may be less than the second distance due to the 3QAM traffic being less tolerant of the noise and imperfections than the PM-BPSK traffic (e.g., due to 3QAM data rate being greater than PM-BPSK data rate).

Additionally, the 3QAM traffic may include three bits per dual polarized symbol which may cause a third data rate of the 3QAM traffic to be less than the first data rate of the PM-QPSK traffic and greater than the second data rate of the PM-BPSK traffic. The three bits may, for example, correspond to a payload bit and/or two bits associated with error correction and/or identification. The third data rate may be approximately three-fourths of the first data rate due to the three bits per 3QAM symbol compared to four bits per PM-QPSK symbol and may be one and one-half times the second data rate due to the three bits per 3QAM symbol compared to 2 bits per PM-BPSK symbol. The coherent optical system may also, or alternatively, transport PM-QPSK traffic and/or PM-BPSK traffic in a manner similar to that described above with respect to FIGS. 1A and/or 1B, respectively.

By way of example, the coherent optical transmitter may transmit 3QAM traffic by converting each three-bit 3QAM symbol to a four-bit PM-QPSK symbol in a manner to be described in greater detail below with respect to FIG. 3. The coherent optical transmitter may also, or alternatively, use a first delay mechanism (e.g., shown as a dashed box labeled "delay 1") to cause a respective first pair of bits, associated with a first polarization of each PM-QPSK symbol, to be delayed relative to a respective second pair of bits, associated with a second polarization of each PM-QPSK symbol. The coherent optical transmitter may transmit, as converted 3QAM traffic, the first pairs of delayed bits and the second pairs of bits to the coherent optical receiver over the optical fiber.

The coherent optical receiver may receive the converted 3QAM traffic and may use an equalization mechanism (e.g., shown as a dashed box labeled "equalization") to process the converted 3QAM traffic. The coherent optical receiver may, for example, perform equalization on the first pairs of delayed bits, at a different time than the second pairs of bits, in a manner to be described in greater detail below with respect to FIG. 5. The equalization mechanism may enable the PM-QPSK symbols, that have been degraded as a result of being transmitted over the fiber optic cable, to be recovered. The coherent optical receiver may also, or alternatively, use a second delay mechanism (e.g., shown as a dashed box labeled "delay 2") to cause the second pairs of bits of the PM-QPSK symbols, to be delayed relative to the first pairs of delayed bits. The second delay mechanism may cause the first pair of delayed bits (e.g., delayed by the first delay mechanism) and the second pair of delayed bits (e.g., delayed by the second delay mechanism) to be synchronized in time such that an amount of delay of the first pair of bits is approximately equal to an amount of delay of the second pair of bits. The coherent optical receiver may convert the first pairs of delayed bits and the second pairs of delayed bits to the three-bit 3QAM symbols.

Enabling the coherent optical system to transport the 3QAM traffic, may enable traffic to continue to be transported when system margin are not available to transmit the PM-QPSK traffic. Additionally, the 3QAM traffic may also allow the traffic to be transported at a higher data rate than the PM-BPSK traffic.

Figure 2:
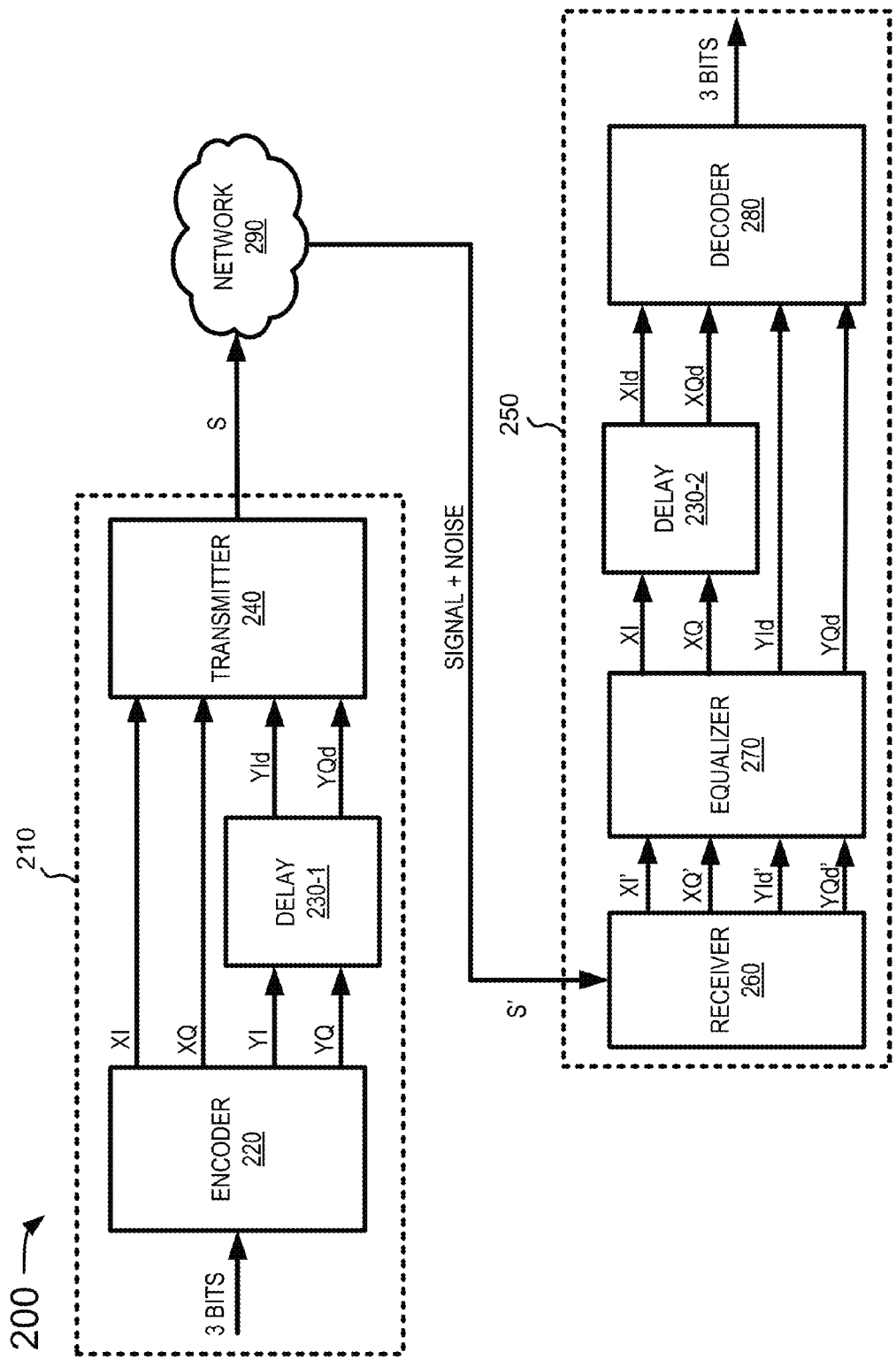
FIG. 2 is a block diagram of an example environment in which systems and/or methods described herein may be implemented.

FIG. 2 is a diagram of an example environment 200 in which systems and/or methods described herein may be implemented. Environment 200 may include an optical transmitter 210, an optical receiver 250, and a network 290. Optical transmitter 210 may include one or more devices that generate, process, and/or transmit an optical signal. In an example implementation, optical transmitter 210 may be a network device, such as a network node, a coherent optical transmitter, and/or some type of optical device. Optical transmitter 210 may include an encoder 220, a delay 230-1, and a transmitter 240. Optical transmitter 210 may receive an electrical signal, may perform operations on the electrical signal, such as forward error correction, interleaving, modulation, etc. In one example, optical transmitter 210 may process the electrical signal to generate a 3QAM signal (e.g., based on a three-bit symbol), and may generate an encoded optical signal that conforms to a PM-QPSK format (e.g., a four bit symbol) based on the processed 3QAM signal. Optical transmitter 210 may transmit the encoded optical signal to optical receiver 250 via network 290 (e.g., via an optical fiber, a fiber plant, etc.).

Encoder 220 may include one or more components that provide encoding of symbols. In one example, encoder 220 may be a coherent encoder. Encoder 220 may, for example, convert a three-bit symbol, associated with a 3QAM format, to a four-bit symbol associated with a PM-QPSK format. For example, the four-bit symbol may include a first bit (e.g., XI) associated with an in-phase component (e.g., I) and a first polarization (e.g., X polarization); a second bit (e.g., XQ) associated with a quadrature component (e.g., Q) and the first polarization (e.g., X polarization); a third bit (e.g., YI) associated with the in-phase component (e.g., I) and a second polarization (e.g., Y polarization); and a fourth bit (e.g., YQ) associated with the quadrature component (e.g., Q) and the second polarization (e.g., Y polarization). The four bits may be associated with a known phase, polarization angle (e.g., between X and Y components), quadrature angle (e.g., between I and Q components), etc. that allows optical receiver 250 to perform coherent processing on symbols received by optical transmitter 210. Encoder 220 may output a first pair of bits (e.g., YI and YQ), associated with the second polarization, to delay 230-1, and may output a second pair of bits (e.g., XI and XQ), associated with the first polarization, to transmitter 240. While FIG. 2 shows the first pair of bits being outputted to delay 230-1, in another example, encoder 220 may output the second pair of bits to delay 230-1 and may output the first pair of bits to transmitter 240.

Delay 230-1 may include one or more components that cause one or more bits to be delayed for a time period. For example, delay 230-1 may receive the second pair of bits (e.g., associated with YI and YQ) from encoder 220 and may cause the second pair of bits to be delayed for a time period relative to the first pair of bits (e.g., associated with XI and XQ). Delaying the second pair of bits may cause the first pair of bits to be processed, by optical receiver 250, at a different time than the delayed second pair of bits. Delay 230-1 may, for example, delay the second pair of bits, for a time period that corresponds to one or more clock cycles associated with optical transmitter 210. The time period may be predetermined by optical transmitter 210 and/or by an operator associated with optical transmitter 210. Determining the quantity of clock cycles of delay will be described in greater detail below. Delay 230-1 may output the delayed second pair of bits (e.g., shown as YId and YQd) to transmitter 240, which may cause the delayed second pair of bits to be received, by transmitter 240, after the first pair of bits are received.

Transmitter 240 may include one or more components that generate and/or transmit an optical signal. Transmitter 240 may generate an optical signal based on the symbols and/or samples received from encoder 220 and/or delay 230-1. Transmitter 240 may, in an example implementation, include a laser that generates an optical signal. Additionally, or alternatively, transmitter 240 may include a modulator that modulates the optical signal based on an input electrical signal (e.g., the bits received from encoder 220 and/or delay 230-1). In one example, transmitter 240 may modulate the optical signal using PM-QPSK techniques. Additionally, or alternatively, transmitter 240 may include a multiplexer to multiplex the modulated optical signal (e.g., using wavelength-division multiplexing) for transmission to optical receiver 250 via network 290. The optical signal (e.g., S), output by transmitter 240, may include a stream that includes pairs of bits (e.g., pairs of delayed bits and pairs of non-delayed bits).

Optical receiver 250 may include one or more devices that receive optical signals, process the optical signals, convert the optical signals to electrical signals, perform processing on the electrical signals, and/or output the processed electrical signals. In an example implementation, optical receiver 250 may be a network device, such as a network node, a coherent optical receiver and/or some type of optical device. Optical receiver 250 may include a receiver 260, an equalizer 270, a delay 230-2, and a decoder 280.

Optical receiver 250 may receive a signal (e.g., S') from optical transmitter 240 via network 290. The signal may include the signal (e.g., S) and a quantity of noise (e.g., phase noise, polarization noise and/or some other type of noise) that is acquired during transmission, such as from optical transmitter 210, imperfections within the transmission medium (e.g., optical fiber, etc.), network 290 (e.g., amplifiers, network nodes), optical receiver 250, etc.

Receiver 260 may include one or more components that receive, convert, process, amplify, and/or demodulate signals in a manner described herein. Receiver 260 may include a photo detector (e.g., a photo diode) that receives an optical signal. Additionally or alternatively, receiver 260 may include a de-multiplexer (demux) that de-multiplexes the optical signal (e.g., using wave-division de-multiplexing) into one or more optical signals for processing. In an example implementation, receiver 260 may be a coherent optical receiver that receives and/or processes a phase-modulated optical signal (e.g., PM-QPSK, etc.). Receiver 260 may, for example, process the signal to break the optical signal into constituent polarization components (e.g., X and Y polarizations), in-phase and/or quadrature components (e.g., I and/or Q, respectively), etc. Receiver 260 may demodulate the components to create electrical signals and may convert the electrical signals from analog signals to digital signals. Receiver 260 may output the components as digital electrical signals associated with the first and second pairs of bits (e.g., XI,' XQ,' YId,' and YQd'). Each of the bits may include a portion of the noise that was included in the received optical signal (e.g., S').

Equalizer 270 may include one or more components that receive, equalize, and/or perform other operations on digital electrical signals. In an example implementation, equalizer 270 may perform equalization on bits received from receiver 260. Equalizer 270 may, for example, amplify or attenuate particular frequencies, associated with the received bits, that reduces degradation affects of the noise and inter-symbol interference caused by the transmission of the signal. Equalizer 270 may also, or alternatively, perform the equalization on the bits to restore a wave form, associated with the received bits, to a wave form with which the bits were transmitted. Restoring the wave form to the transmitted wave form may enable the bits, transmitted by optical transmitter 210, to be recovered. Equalizer 270 may output a first pair of equalized bits (e.g., XI and XQ) to delay 230-2 and may output a second pair of equalized delayed bits (e.g., YId and YQd) to decoder 280.

While FIG. 2 shows the first pair of bits being outputted to delay 230-2, in another example implementation, equalizer 270 may output the second pair of bits to delay 230-2 when the first pair of bits are outputted to delay 230-1 by encoder 220. Equalizer 270 will be described in greater detail below with respect to FIG. 5.

Delay 230-2 may include one or more components that cause one or more bits to be delayed for the time period used by delay device 230-1. For example, delay 230-2 may receive the first pair of bits (e.g., associated with XI and XQ) from equalizer 270 and may cause the first pair of bits to be delayed for a same amount of time that the second pair of bits were delayed by delay 230-1. Delaying the first pair of bits by the same amount of time may cause the first pair of bits and the second pair of bits to be synchronized in time when delay 230-2 outputs the first pair of delayed bits (e.g., XId and XQd) to decoder 280.

The time period associated with the delay may be predetermined by optical transmitter 210 and/or an operator of optical transmitter 210 and/or optical receiver 250. The time period may correspond to one or more clocks cycles. The quantity of clock cycles may depend on a quantity of symbols being processed and/or stored by equalizer 270 at a given point in time. For example, if equalizer 270 spans six symbols (e.g., six different sets of XI, XQ, YId, and YQd), and processes one symbol per clock cycle, then the time period may correspond to a quantity of clock cycles that is greater than six (e.g., 7, 8, 9, etc.). The span may correspond to a size of memory associated with equalizer 270. In this way, a first pair of bits, associated with a first symbol, may not be processed or stored, by equalizer 270, at the same time that a second pair of delayed bits, associated with the first symbol, are being processed or stored by equalizer 270. Thus, equalizer 270 may not process the first symbol that correspond to a PM-QPSK state (e.g., sometimes referred to as a "degenerative state") that, when decoded by decoder 280, would cause an error to occur in the 3QAM signal. The degenerative state will be described in greater detail below with respect to FIG. 4.

Decoder 280 may include one or more components that provide decoding of symbols and/or samples received from equalizer 270 and/or delay 230-2. In one example, decoder 280 may correspond to a coherent decoder. Decoder 280 may, for example, convert a four-bit symbol, associated with a PM-QPSK format, to a three-bit 3QAM symbol. For example, the four-bit symbol may include a first delayed bit (e.g., XId), a second delayed bit (e.g., XQd), a third delayed bit (e.g., YId), and a fourth delayed bit (e.g., YQd) that correspond to the first bit (e.g., XI), second bit (e.g., XQ), third bit (e.g., YI), and fourth bit (e.g., YQ), respectively, that were output by encoder 220. Decoder 280 may convert the four bits to a three-bit 3QAM symbol.

Network 290 may include one or more fiber optic-based networks (e.g., such as a fiber plant that provides long haul transmission of optical signals), and/or a combination of fiber optic networks and other types of networks, such as a wired and/or wireless network.

The quantity of devices, components, and/or networks, illustrated in FIG. 2, is provided for explanatory purposes. In practice, there may be additional devices, components, and/or networks; fewer devices, components, and/or networks; different devices, components, and/or networks; or differently arranged devices, components, and/or networks than illustrated in FIG. 2. Also, in some implementations, one or more of the devices and/or components, of environment 200 may perform one or more functions described as being performed by another one or more of the devices and/or components of environment 200.

FIG. 3 is a diagram of an example data structure 300 that stores information that associates three-bit 3QAM symbols with four-bit PM-QPSK symbols. Data structure 300 may be stored in a storage device associated with encoder 220 or decoder 280. Data structure 300 may include a collection of fields, such as a 3QAM symbol field 305, a X polarization (X pol)/in-phase bit field 310, a X pol/quadrature (quad) bit field 315, a Y polarization (Y pol)/in-phase bit field 320, and a Y pol/quad bit field 325. A quantity of fields shown within data structure 300 are included for explanatory purposes. In other implementations, there may be additional fields, fewer fields, different fields, or differently arranged fields than are shown with respect to FIG. 3.

3QAM symbol field 305 may store a set of values that corresponds amplitudes of a three-bit 3QAM symbol. For example, 3QAM techniques provide three bits per symbol (e.g., N=3) resulting in eight different bit combinations (e.g., $2^N=8$ when N=3) or eight different 3QAM symbols (e.g., shown as 000, 001, 010, 011, 100, 101, 110, and 111 by ellipse 327). 3QAM symbol field 305 may, thus, store one of eight different sets of values that corresponds to one of eight different three-bit 3QAM symbols.

X pol/in-phase bit field 310 may store a value that corresponds to an amplitude of an in-phase component, associated with a first polarization (e.g., X polarization), of a particular PM-QPSK symbol. The value may correspond to a first value (e.g., 1 or some other first value) or a second value (e.g., –1 or some other second value). X pol/quad bit field 315 may store a first or second value that corresponds to an amplitude of a quadrature component, associated with the first polarization, of the particular PM-QPSK symbol. Y pol/in-phase bit field 320 may store a first or second value that corresponds to an amplitude of a quadrature component, associated with a second polarization, of the particular PM-QPSK symbol. Y pol/quad bit field 325 may store a first or second value that corresponds to an amplitude of a quadrature component, associated with the second polarization, of the particular PM-QPSK symbol.

Thus, the particular PM-QPSK symbol may include the values stored by X pol/in-phase bit field 310, X pol/quad bit field 315, Y pol/in-phase bit field 320, and Y pol/quad bit field 325. Furthermore, the particular PM-QPSK symbol may include four bits per symbol (e.g., N=4) resulting in 16 different bit combinations (e.g., $2^N=16$ when N=4) or 16 different possible symbols (e.g., –1, –1, –1, –1 as shown by ellipse 329; –1, –1, –1, 1 as shown by ellipse 331, . . . , and 1, 1, 1, 1 as shown by ellipse 337). The values associated with the four-bit combinations may define a modulation state (e.g., a PM-QPSK state) of a symbol in a manner to be described in greater detail below with respect to FIGS. 4A and 4B.

By way of example, 3QAM symbol field 305 may store a first set of three values (e.g., 000), associated with a first 3QAM symbol, that may correspond to a first set of four values, stored within fields 310-325, associated with a first four-bit symbol (e.g., –1, –1, –1, –1 as shown by ellipse 329); a second set of three values (e.g., 001), associated with a second 3QAM symbol, that may correspond to a second set of four values (e.g., –1, –1, 1, 1 as shown by ellipse 333); a third set of three values (e.g., 010), associated with a third 3QAM symbol, that may correspond to a third set of four values (e.g., –1, 1, 1, –1 as shown by ellipse 335); and so on. Thus, each 3QAM symbol, identified by the sets of three values stored within 3QAM field 305, may correspond to a respective different four-bit symbol identified by the sets of four values stored within fields 310-325. Additionally, or alternatively, some of the 16 possible four-bit symbols may not be associated with a 3QAM symbol (e.g., shown by the shaded rows within FIG. 3). Thus, even though the sets of four values represent a valid PM-QPSK symbol, some of the sets of four values may not be used for processing 3QAM symbols. Optical receiver 250 may cause an error to occur if a PM-QPSK symbol, that does not correspond to a 3QAM symbol, is used to process 3QAM traffic.

Figure 4C:
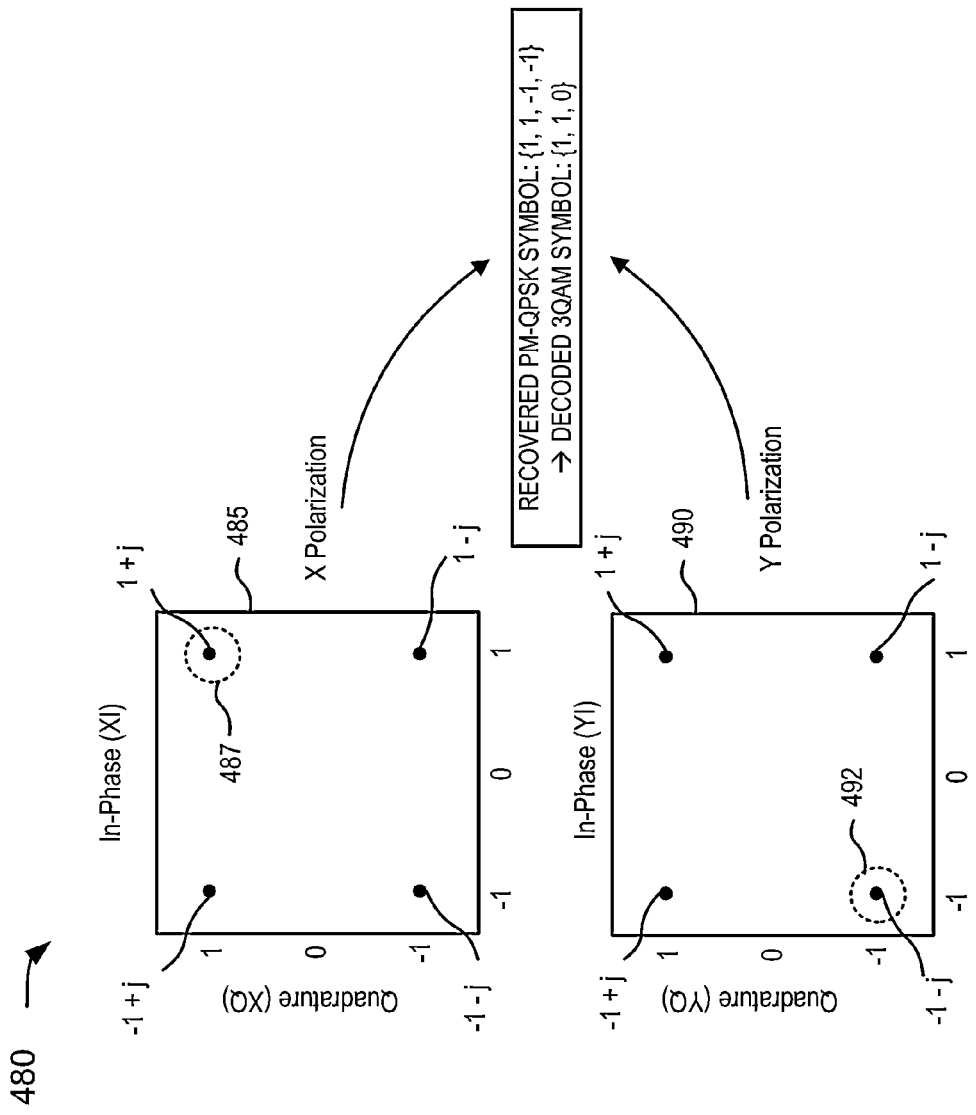

FIGS. 4A-4C are diagrams of example modulation states 400-480, respectively, associated with four-bit symbols being processed by optical receiver 250. As illustrated in FIG. 4A, modulation state 400 may include a first modulation state 410 associated with a first polarization (e.g., shown as X polarization) and a second modulation state 420 associated with a second polarization (e.g., shown as Y polarization). First modulation state 410 and/or second modulation state 420 may correspond to a state in which four-bit PM-QPSK symbols can be processed, by optical receiver 250, to recover three-bit 3QAM symbols.

First modulation state 410 and second modulation state 420 may identify a range of amplitudes (e.g., –1 to +1 or some other range) associated with a quadrature component (e.g., shown as "Quadrature (Q)" on a vertical axis of first modulation state 410 and second modulation state 420) and a range of amplitudes (e.g., –1 to +1 or some other range) associated with an in-phase component (e.g., shown as "In-Phase (I)" on a horizontal axis of first modulation state 410 and second modulation state 420). First modulation state 410 may identify four possible states associated with X-polarized bits of a four-bit PM-QPSK symbol. A first state may correspond to a negative in-phase component and a positive quadrature component (e.g., –1+j; a second state may correspond to a positive in-phase component and a positive quadrature phase component (e.g., 1+j); a third state may correspond to a positive in-phase component and a negative quadrature component (e.g., 1–j); and a fourth state may correspond to a negative in-phase component and a negative quadrature phase component (e.g., –1–j).

Second modulation state 420 may identify four possible states associated with Y-polarized bits of a four-bit PM-QPSK symbol. A first state may correspond to a negative in-phase component and a positive quadrature component (e.g., –1+j); a second state may correspond to a positive in-phase component and a positive quadrature phase component (e.g., 1+j); a third state may correspond to a positive in-phase component and a negative quadrature component (e.g., 1–j); and a fourth state may correspond to a negative in-phase component and a negative quadrature phase component (e.g., –1–j).

By way of example, optical transmitter 210 may encode a 3QAM symbol (e.g., 0, 0, 0) as a four-bit PM-QPSK symbol (e.g., −1, −1, −1, −1) based on the data structure 300 of FIG. 3. The four-bit PM-QPSK symbol may correspond to a modulation state (e.g., −1−j in X polarization as shown by dashed circle 412 and −1−j in Y polarization dashed circle 422). Optical transmitter 210 may transmit the four-bit PM-QPSK symbol and optical receiver 250 may receive the four-bit PM-QPSK symbol that has been degraded by noise and inter-symbol interference (e.g., due to transmission over an optical fiber and/or via network 290). For example, the received four-bit symbol may have a different polarization angle, amplitude, etc. than what existed before transmission due to polarization rotation that is cause by imperfections occurring within the optical fiber. Equalizer 270 may process the degraded four-bit symbol to recover the four-bit PM-QPSK symbol in a modulation state that existed when the four-bit PM-QPSK symbol was transmitted. Recovering the four-bit PM-QPSK symbol in the state that existed before being transmitted may enable the three-bit 3QAM symbol (e.g., 0, 0, 0) to be recovered by optical receiver 250 without causing errors to occur.

As illustrated in FIG. 4B, modulation state 450 may include a third modulation state 460 associated with the first polarization and a fourth modulation state 470 associated with the second polarization. Third modulation state 460 and fourth modulation state 470 may correspond to a modulation state, of the four-bit PM-QPSK symbols received by optical receiver 250, after being degraded by transmission between optical transmitter 210 and optical receiver 250. Furthermore, third modulation state 460 and/or fourth modulation state 470 may identify a specialized case in which the received four-bit PM-QPSK symbol includes a polarization angle that has rotated a particular amount relative to a polarization angle with which the four-bit PM-QPSK symbol was transmitted. The particular amount of rotation may correspond to an amount of power that has transferred (sometimes referred to as "X/Y power exchange" and represented by θ) from a component associated with X polarization to a component associated with Y polarization or vice versa (e.g., θ=45 degrees). The particular amount of rotation may also, or alternatively, correspond to a change in phase angle (sometimes referred to as "X/Y differential phase" and represented by φ) between the component associated with X polarization and the component associated with Y polarization (e.g., φ=90 degrees).

By way of example, the amount of degradation due to polarization angle rotation during transmission may be represented by Jones' rotation equation (1):

$$\begin{bmatrix} e^{-j\phi}\cos\theta & -\sin\theta \\ \sin\theta & e^{j\phi}\cos\phi \end{bmatrix} \begin{vmatrix} \theta = 45 \text{ deg.} \\ \phi = 90 \text{ deg.} \end{vmatrix} = \frac{1}{\sqrt{2}} \begin{bmatrix} -j & -1 \\ 1 & j \end{bmatrix} \quad (1)$$

Thus, the change in phase modulation state, of the received four-bit PM-QPSK symbol, as a result of the polarization rotation may be represented by equation (2):

$$= \frac{1}{\sqrt{2}} \begin{bmatrix} -j & -1 \\ 1 & j \end{bmatrix} \begin{bmatrix} x \\ y \end{bmatrix} = \frac{1}{\sqrt{2}} \begin{bmatrix} -j & -1 \\ 1 & j \end{bmatrix} \begin{bmatrix} -1-j \\ -1-j \end{bmatrix} = \sqrt{2} \begin{bmatrix} j \\ -j \end{bmatrix} \quad (2)$$

Where x=−1−j (as shown by the dashed circle 412 of FIG. 4A) and where y=−1−j (e.g., as shown by dashed circle 422 of FIG. 4A).

Based on the rotation in polarization angle, third modulation state 460 may, for example, identify four possible states associated with X-polarized bits of the received PM-QPSK symbol. A first state may correspond to a positive quadrature component (e.g., j*√2); a second state may correspond to a positive in-phase component (e.g., √2); a third state may correspond to a negative quadrature component (e.g., −j*√2); and a fourth state may correspond to a negative in-phase component (e.g., −√2).

Similarly, fourth modulation state 470 may identify four possible states associated with Y-polarized bits of the received PM-QPSK symbol. A first state may correspond to a positive quadrature component (e.g., j*√2); a second state may correspond to a positive in-phase component (e.g., √2); a third state may correspond to a negative quadrature component (e.g., −j*√2); and a fourth state may correspond to a negative in-phase component (e.g., −√2).

The changed modulation state, represented by third modulation state 460 and/or fourth modulation state 470, may correspond to a valid PM-QPSK modulation state that can be processed by equalizer 270. However, the changed modulation state may be different than the modulation state, of the PM-QPSK symbol, prior to transmission, which is represented by first modulation state 410 and second modulation state 420 of FIG. 4A. Thus, when equalizer 270 processes the PM-QPSK symbol with the changed modulation state, a false lock may occur. The false lock may, for example, cause errors to occur when the PM-QPSK symbol is processed (e.g., based on a carrier recovery operation) and/or decoded to covert the PM-QPSK symbol to the 3QAM symbol.

As illustrated in FIG. 4C, modulation state 480 may represent modulation state 450 of FIG. 4B, associated with the four-bit PM-QPSK symbol, after being processed by optical receiver 250 (e.g., equalization and carrier recovery) and before being converted to a 3QAM symbol. The carrier recovery operation may, for example, recover a four-bit PM-QPSK symbol by multiplying the equalized PM-QPSK symbol by a reference phase (e.g., represented by $e^{-j\pi/4}$). The recovered PM-QPSK symbol may be associated with a modulation state represented by fifth modulation state 485 associated with the X polarization and sixth modulation state 490 associated with the Y polarization. For example, the recovered PM-QPSK symbol may be associated with a state for X polarization (e.g., 1+j as shown by dashed circle 487) and a state for Y polarization (e.g., −1−j as shown by dashed circle 492) that corresponds to a different PM-QPSK symbol (e.g., 1, 1, −1, −1) than what was transmitted (e.g., −1, −1, −1, −1 as shown in FIG. 4A). Decoding the recovered PM-QPSK symbol may result in a different 3QAM symbol (e.g., 1, 1, 0) than what was transmitted (e.g., 0, 0, 0 as shown in FIG. 4A), which may cause errors to occur within the 3QAM traffic.

Therefore, causing a first pair of bits (e.g., associated with X polarization) of the received four-bit PM-QPSK symbol and a second pair of bits (e.g., associated with Y polarization), of the received four-bit PM-QPSK symbol, to be processed separately (e.g., with respect to time), may enable the false lock to be avoided. Delay devices 230-1 and 230-2 may enable the first pair of bits and the second pair of bits to be processed separately, by equalizer 270, with respect to time.

Figure 5:
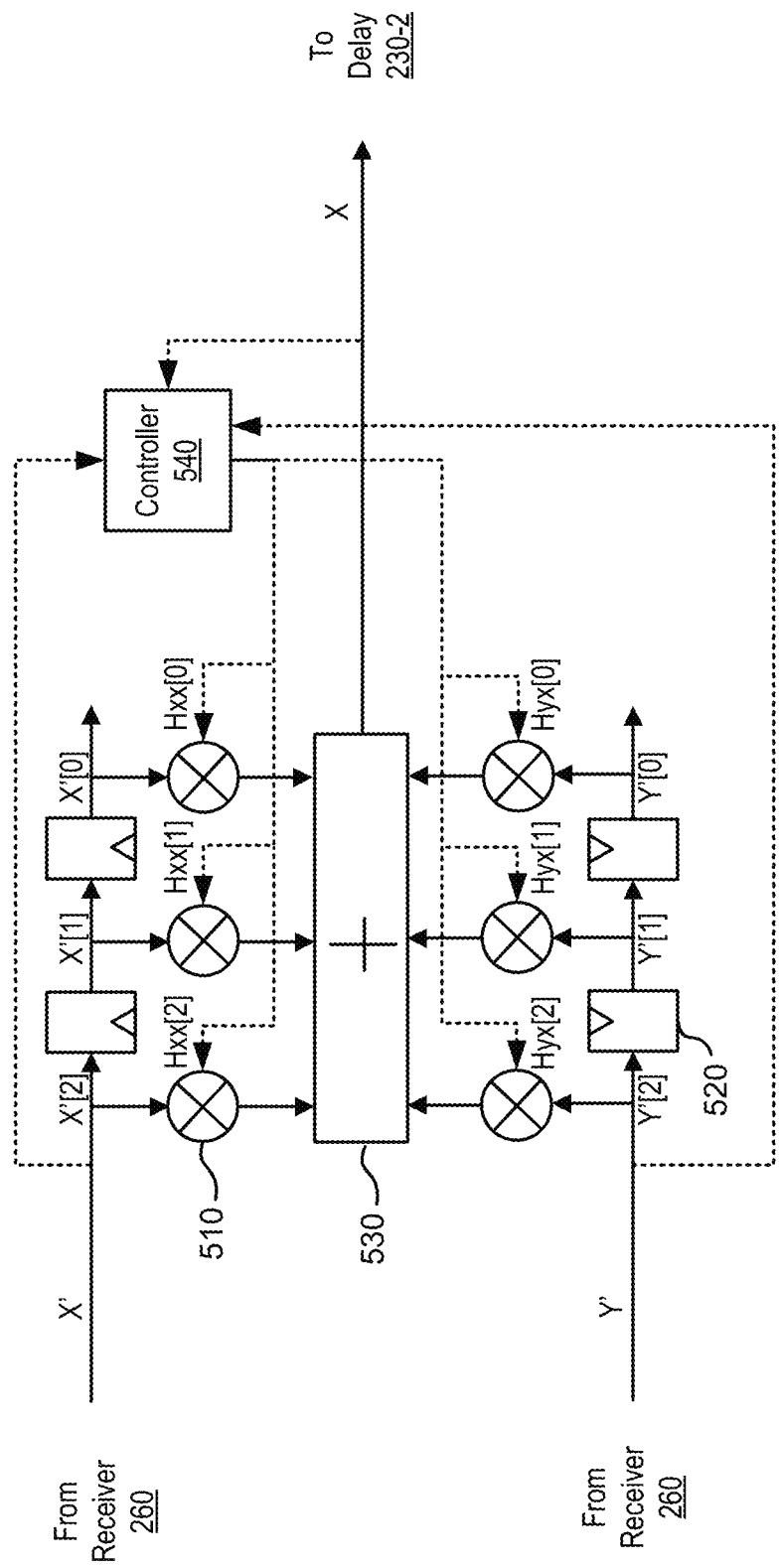
FIG. 5 is a diagram of example components of an equalizer of FIG. 2.

FIG. 5 is a diagram of example components of equalizer 270. As shown in FIG. 5, equalizer 270 may include group of multipliers 510 (hereinafter referred to collectively as multipliers 510" and individually as "multiplier 510"), a group of flip flop components 520 (hereinafter referred to collectively as flip flops 520" and individually as "flip flop 520"), a mixer 530, and a controller 540. Components 510-540, of equalizer 270, are included for explanatory purposes. In other implementations there may be additional components, fewer components, different components, or differently arranged components than shown in FIG. 5.

Multiplier 510 may multiply two or more signals to create a combined signal. For example, multiplier 510 may receive a bit associated with a four-bit symbol and may receive a tap signal, to be described in greater detail below, from controller 540. Multiplier 510 may generate a combined signal by multiplying the bit by the tap signal and may output the combined signal to mixer 530.

Flip flop 520 may receive, store, or output bits based on one or more clock cycles associated with optical receiver 250. For example, flip flop 520 may receive, from receiver 260, a first bit, associated with a four-bit symbol, during a first clock cycle; may store the first bit during a second clock cycle; and/or may output the first bit during a third clock cycle. Additionally, or alternatively, flip flop 520 may receive a second bit during the second clock cycle; may store the second bit during the third clock cycle; and/or may output the second bit during a fourth clock cycle. Flip flop 520 may, on a per bit bases, continue to receive, store, and/or output bits based on the clock cycle.

Mixer 530 may receive combined signals from each multiplier 510 and may sum the combined signals to create an equalized signal associated with a first polarization (e.g., X polarization). The equalized signal may include four-bit symbols that have been processed to reduce degradation affects (e.g., polarization angle rotation, quadrature angle rotation, attenuation, etc.) caused by being transmitted between optical transmitter 210 and optical receiver 250.

Controller 540 may generate tap signals to be used to process the four-bit symbols received from receiver 260. For example, controller 540 may monitor a first pairs of bits, associated with a first polarization (e.g., X polarization) and second pairs of bits, associated with a second polarization (e.g., Y polarization), received from receiver 260 (e.g., X' and Y', respectively) and equalized bits associated with the equalized signal that is output by mixer 530. Based on differences between the first pairs of bits and the equalized bits, controller 540 may determine transmission values that represent a manner in which the four-bit symbols are degraded, when transmitted to optical receiver 250, via the fiber optic cable and/or network 290, as shown below in equation (1):

$$\begin{bmatrix} x' \\ y' \end{bmatrix} = \begin{bmatrix} Cxx & Cyx \\ Cxy & Cyy \end{bmatrix} \begin{bmatrix} x \\ y \end{bmatrix}$$

In equation (1), X and Y may represent four-bit symbols that are generated by optical transmitter 210 (e.g., where X represents XI and XQ components, and where Y represents YI and YQ components) and transmission values (e.g., Cxx, Cyx, Cxy and Cyy) may represent a manner in which the transmission medium degrades the four-bit symbols (e.g., associated with X' and Y'). The transmission values may, in one example, be complex numbers that, when multiplied by four-bit symbols, yield degraded four-bit symbols (e.g., as shown in equation (1)) received by optical receiver 250. Thus, controller 540 may generate tap values (e.g., Hxx, Hyx, Hxy and Hyy), based on the transmission values, to be used to process degraded four-bit symbols to reduce or eliminate the degradation affects caused by transmission (e.g., by reducing an angle associating with polarization rotation, reducing an angle associated with quadrature angle rotation, amplifying or attenuating particular frequencies, etc.) as represented below in Equation (2):

$$\begin{bmatrix} x \\ y \end{bmatrix} = \begin{bmatrix} Hxx & Hyx \\ Hxy & Hyy \end{bmatrix} \begin{bmatrix} x' \\ y' \end{bmatrix}$$

In equation (2), the tap values, generated by controller 540, may be output, to multipliers 510, as tap signals. Each tap value may, for example, correspond to one or more complex values (e.g., Hxx[0], Hxx[1], Hxx[2], etc.; Hyx[0], Hyx[1], Hyx[2], etc.; and so on) associated with polarization angle rotation, quadrature angle rotation, gain, attenuation, etc. as a function of frequency. When the degraded four-bit symbols (e.g., X' and Y') are multiplied by the tap values (e.g., by multipliers 510), the four-bit symbols, generated by optical transmitter 210, may be recovered from the degraded four-bit symbols. The recovered four-bit symbols may correspond to a state that existed prior to being transmitted by optical transmitter 210.

By way of example, a set of bits (e.g., X'[0], X'[1], and X'[2], etc.) associated with X polarization and a set of bits (e.g., Y'[0], Y'[1], and Y'[2], etc.), associated with Y polarization, may be received from receiver 260. Multipliers 510 may multiply the set of bits, associated with the first polarization, with a first set of tap signals and may provide first multiplied signals to mixer 530 (e.g., X'[0]*Hxx[0], X'[1]*Hxx[1], X'[2]*Hxx[2], etc.). Additionally, or alternatively, multipliers 510 may multiply the set of bits, associated with the second polarization, with a second set of tap signals and may provide second multiplied signals to mixer 530 (e.g., Y'[0]*Hyx[0], Y'[1]*Hyx[1], Y'[2]*Hyx[2], etc.). Mixer 530 may receive the first multiplied signals and the second multiplied signals and may add the signals to provide, to delay 230-2 an equalized signal (e.g., X) associated with the first polarization. The equalized signal may correspond to a recovered first pair of bits (e.g., XI and XQ), associated with a four-bit symbol that was generated by optical transmitter 210.

Equalizer 270 may include another group multipliers 510, another group of flip flops 520, another mixer 530, and/or another controller 540 (not shown in FIG. 5) that, in a manner similar to that described above, equalize received bits (e.g., X' and Y') using a third set of tap signals and a fourth set of tap signals. The other multipliers 510 may, for example, multiply the set of bits, associated with the second polarization, with the third set of tap signals and may provide third multiplied signals to the other mixer 530 (e.g., Y'[0]*Hyy[0], Y'[1]*Hyy[1], Y'[2]*Hyy[2], etc.). Additionally, or alternatively, the other multipliers 510 may multiply the set of bits, associated with the first polarization, with a fourth set of tap signals and may provide fourth multiplied signals to the other mixer 530 (e.g., X'[0]*Hxy[0], X'[1]*Hxy[1], X'[2]*Hxy[2], etc.). The other mixer 530 may receive the third multiplied signals and the fourth multiplied signals and may add the signals to provide, to decoder 280, an equalized signal (e.g., Y) associated with the second polarization. The equalized signal may correspond to a recovered second pair of delayed bits (e.g., YId and YQd), associated with a four-bit symbol that was generated by optical transmitter 210.

Additionally, or alternatively, the tap values may be determined in a different way. For example, controller 540 may determine the tap values in a manner that reduces a quantity of errors (e.g., based on a bit error rate, etc.) associated with the recovered four-bit symbols. Controller 540 may, for example, communicate with decoder 280 to identify a first quantity of errors associated with a first set of recovered four-bit symbols that were obtained using first tap values. Controller 540 may also, or alternatively, generate a second set of tap values to be used to process degraded four-bit symbols and may communicate with decoder 280 to identify a second quantity of errors associated with a second set of recovered four-bit symbols that were obtained using the second tap values. When the second quantity of errors is less than the first quantity of errors, controller 540 may cause a third set of recovered four-bit symbols to be obtained using the second tap values. When the second quantity of errors is not less than the first quantity of errors, controller 540 may cause a fourth set of recovered four-bit symbols to be obtained using tap values that are different than the second tap values (e.g., the first tap values or some other tap values that are different than the second tap values).

Figure 6:
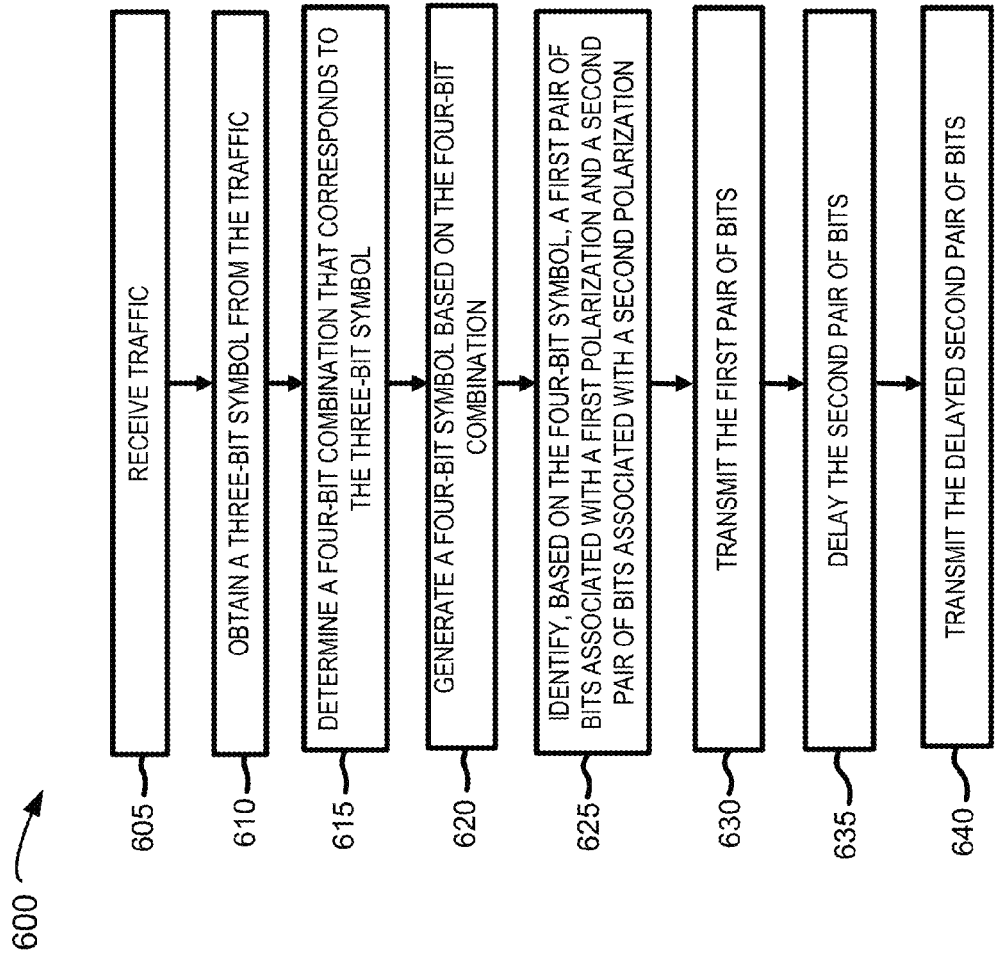
FIG. 6 is a flow chart of an example process for encoding and transmitting traffic as encoded four-bit symbols, according to an implementation described herein.

FIG. 6 is a flow chart of an example process 600 for transmitting a 3QAM signal encoded as a PM-QPSK signal, according to an implementation described herein. In one example implementation, process 600 may be performed by optical transmitter 210. Alternatively, or additionally, some or all of process 600 may be performed by a device or collection of devices separate from, or in combination with, optical transmitter 210.

As shown in FIG. 6, process 600 may include receiving traffic (block 605) and obtaining a three-bit symbol from the traffic (block 610). For example, optical transmitter 210 may receive traffic that is to be transmitted to optical receiver 250. In one example, the traffic may correspond to 3QAM traffic that includes a train of three-bit symbols. Optical receiver 210 may obtain, from the traffic, a three-bit symbol.

As also shown in FIG. 6, process 600 may include determining a four-bit combination that corresponds to the three-bit symbol (block 615) and generating a four-bit symbol based on the four-bit combination (block 620). For example, optical receiver 210 may determine a four-bit combination that corresponds to the three-bit symbol obtained from the traffic. In one example, optical receiver 210 may access a data structure (e.g., data structure 300 of FIG. 3) to identify a three-bit symbol, stored within the data structure, that matches the obtained three-bit symbol. Optical transmitter 210 may also, or alternatively, identify a four-bit combination (e.g., associated with XI, XQ, YI, and/or YQ components), stored within the data structure, that corresponds to the three-bit symbol stored within the data structure.

Additionally, or alternatively, optical transmitter 210 may generate a four-bit symbol that corresponds to the identified four-bit pattern. In one example, the four-bit symbol may correspond to a four-bit PM-QPSK symbol.

As further shown in FIG. 6, process 600 may include identifying, based on the four-bit symbol, a first pair of bits associated with a first polarization and a second pair of bits associated with a second polarization (block 625) and transmitting the first pair of bits (block 630). For example, optical transmitter 210 may identify a first pair of bits, associated with the four-bit symbol, that corresponds to a first polarization (e.g., X polarization). The first pair of bits may, for example, include a first bit that corresponds to an in-phase component and a second bit that corresponds to a quadrature component (e.g., XI and XQ, respectively). Additionally, or alternatively, optical transmitter 210 may identify a second pair of bits, associated with the four-bit symbol, that corresponds to a second polarization (e.g., Y polarization). The second pair of bits may, for example, include a third bit that corresponds to an in-phase component and a fourth bit that corresponds to a quadrature component (e.g., YI and YQ, respectively). Optical transmitter 210 may transmit the first pair of bits, to optical receiver 250, via an optical fiber and network 290.

As yet further shown in FIG. 6, process 600 may include delaying the second pair of bits (block 635) and transmitting the delayed second pair of bits (block 640). For example, optical transmitter 210 may determine a period of time that the second pair of bits is to be delayed, relative to a time that the first pair of bits were transmitted. The period of time may be predetermined by optical transmitter 210 and/or specified by an operator of optical transmitter 210. The period of time may also, or alternatively, be based on a quantity of clock cycles that is greater than a span associated with equalizer 270 (e.g., that corresponds to a memory size and/or as quantity of symbols that equalizer 270 can process or store at a given point in time). The quantity of clock cycles being greater than the span of equalizer 270 may ensure that the first pair of bits cannot be processed or stored, by equalizer 270, at the same time that the delayed second set of bits are being processed or stored by equalizer 270. After the period of time, transmitter 210 may transmit the delayed second pair of bits, to optical receiver 250, over the optical fiber and via network 290.

Figure 7:
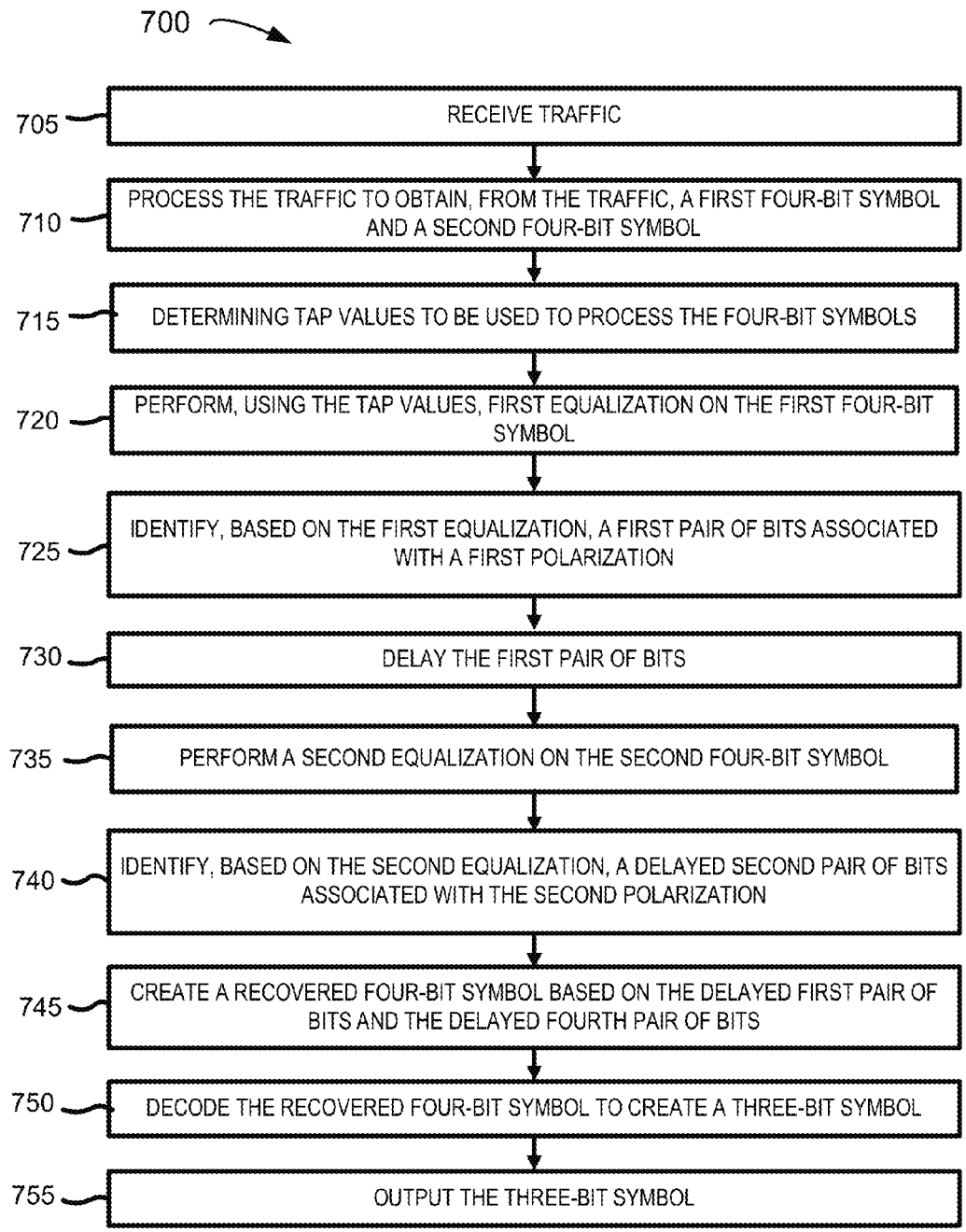
FIG. 7 is a flow chart of an example process for processing received traffic to recover traffic based on three-bit symbols, according to an implementation described herein.

FIG. 7 is a flow chart of an example process 700 for processing received traffic, encoded as four-bit symbols, to recover traffic based on three-bit symbols, according to an implementation described herein. In one example implementation, process 700 may be performed by optical receiver 250. Alternatively, or additionally, some or all of process 700 may be performed by a device or collection of devices separate from, or in combination with, optical receiver 250.

As shown in FIG. 7, process 700 may include receiving traffic (block 705) and processing the traffic to obtain a first four-bit symbol and a second four-bit symbol from the traffic (block 710). For example, optical receiver 250 (e.g., receiver 260) may receive traffic, from optical transmitter 210, via an optical fiber and network 290. The received traffic may include a train of four-bit symbols that have become degraded as a result of being transmitted from optical transmitter 210 to optical receiver 250. For example, one or more bits, associated with the received four-bit symbols, may include a polarization angle and/or quadrature angle that have rotated relative to a polarization angle and/or quadrature angle with which the one or more bits were transmitted. Additionally, or alternatively, the one or more bits may include one or more frequencies that have become attenuated, by an amount that is greater than a threshold, as a result of being transmitted from optical transmitter 210 to optical receiver 250.

Additionally, or alternatively, receiver 250 may process the traffic to obtain a first four-bit symbol and/or a second four-bit symbol. Processing the traffic may include performing a beam splitting to generate a first signal associated with a first polarization (e.g., X polarization or some other first polarization) and a second signal associated with a second polarization (e.g., Y polarization or some other second polarization). Additionally, or alternatively, receiver 250 may cause each of the first signal and the second signal to be divided into a first component signal (e.g., an in-phase component) and a second component signal (e.g., a quadrature component). Receiver 250 may obtain a bit from each of the component signals, associated with each polarization, that corresponds to the first four-bit symbol. The first four-bit signal may, for example, include a first bit (e.g., XI'), associated with an in-phase component, that corresponds to a first polarization; a second bit (e.g., XQ'), associated with a quadrature component, that corresponds to a second polarization; a third bit (e.g., YI'), associated with an in-phase component, that corresponds to the first polarization; and a fourth bit (e.g., YQ'), associated with a quadrature component, that corresponds to the second polarization. Similarly, receiver 250 may obtain a second four-bit symbol in a manner similar to that described above.

The first bit and the second bit may be associated with a four-bit symbol that was generated by optical transmitter 210.

Additionally, or alternatively, a third bit and a fourth bit (e.g., associated with the second polarization), of the second four-bit symbol, may be associated with the four-bit symbol that was generated by optical transmitter 210. Thus, the third bit and the fourth bit, of the second four-bit symbol may be delayed for a period of time (e.g., by delay 230-1) relative to the first bit and the second bit of the first four-bit symbol in a manner similar to that described above with respect to FIG. 6. The first bit and the second bit of the second four-bit symbol and the third bit and the fourth bit of the first four-bit symbol may not be associated with the four-bit symbol generated by optical transmitter 210.

As also shown in FIG. 7, process 700 may include determining tap values to be used to process the four-bit symbols (block 715) and performing, using the tap values, a first equalization on the first four-bit symbol (block 720). For example, optical receiver 250 (e.g., equalizer 270) may, in a manner similar to that described above, determine tap values to be used to process bits associated with the first four-bit symbol. In one example, optical receiver 250 may compare received bits, associated with the first four-bit symbol, with equalized bits associated with a four-bit symbol on which equalization has been performed using first tap values. Optical receiver 250 may, based on the comparison of the received bits and the equalized bits, identify a manner in which transmission, between optical transmitter 210 and optical receiver 250, is degrading traffic being received by optical receiver 250. The manner in which the traffic is being degraded may, for example, be based on a difference in polarization angle, quadrature angle, power level, etc., between the received bits and the particular equalized bits. When the difference in polarization angle and/or quadrature angle is less than a first threshold, optical receiver 250 may, using the first tap values, perform a first equalization on the received bits, in a manner similar to that described above with respect to FIG. 5, to generate first equalized bits. When the difference in polarization angle and/or quadrature angle is not less than the first threshold, optical receiver 250 may generate second tap values and may perform the first equalization, on the received bits, to generate second equalized bits. Similarly, optical receiver 250 may use the first tap values to perform the first equalization on the received bits when the difference in power level is less than a second threshold. When the difference in power level is not less than the second power threshold, optical receiver 250 may generate second tap values with which to perform the first equalization on the received bits.

Additionally, or alternatively, optical receiver 250 may determine an error rate (e.g., bit error rate, etc.) associated with performing equalization using the first tap values. When the error rate is less than a third threshold, optical receiver 250 may use the first tap values to perform the first equalization on the received bits. When the error rate is not less than the third threshold, optical receiver 250 may generate second tap values, with which to perform the first equalization, that causes the first error rate to decrease to a level that is less than the error threshold. Optical receiver 250 may, in this example, use the second tap values to perform the first equalization on the received bits.

As further shown in FIG. 7, process 700 may include identifying, based on the first equalization, a first pair of bits associated with a first polarization (block 725) and delaying the first pair of bits (block 730). For example, optical receiver 250 may identify a first pair of bits, on which the first equalization was performed, that correspond to the first polarization (e.g., XI and XQ). The identified first pair of bits may, as a result of the first equalization, be restored to a condition that existed before the first four-bit symbol was transmitted to optical receiver 250 (e.g., by reducing an amount that a polarization angle or quadrature angle has rotated, by amplifying one or more frequencies, etc.).

Additionally, or alternatively, optical receiver 250 (e.g., delay 230-2) may delay the first pair of bits by an amount that is greater than a delay threshold, to create a delayed first pair of bits (e.g., XId and XQd), associated with the first four-bit symbol. The delay threshold may, for example, correspond to a quantity of clock cycles, associated with optical receiver 250, that is greater than a quantity of four-bit symbols on which equalization can be performed by optical receiver 250 at a given point in time. The quantity of four-bit symbols on which equalization can be performed at the given point in time may correspond to a span of equalizer 270 (e.g., based on a size of memory associated with equalizer 270). In other words, the amount of the delay threshold may be determined such that a second equalization cannot be performed on the third bit and the fourth bit, of the second four-bit symbol (e.g., to be described in greater detail below) at the same time that first equalization is being performed on the first pair of bits. In one example, optical receiver 250 may create the delayed first pair of bits by temporarily storing, in a memory associated with optical receiver 250, the identified first pair of bits for the amount of time that is greater than the delay threshold.

As yet further shown in FIG. 7, process 700 may include performing a second equalization on the second four-bit symbol (block 735) and identifying, based on the second equalization, a delayed second pair of bits associated with the second polarization (block 740). For example, optical receiver 250 may, in a manner similar to that described above with respect to block 720, perform a second equalization on the second four-bit symbol. The second equalization may be performed using the tap values used to perform the first equalization or a different set of tap values (e.g., based on whether a difference in polarization angle and/or quadrature angle is greater than the first threshold; whether a difference in power level is greater than the second threshold; whether an error rate, associated with the first equalization, is greater than the third threshold; etc.).

Optical receiver 250 may also, or alternatively, identify a delayed second pair of bits, on which the second equalization was performed, that correspond to the third bit and the fourth bit, associated with the second four-bit symbol, that corresponds to the second polarization (e.g., YId and YQd). The identified delayed second pair of bits may, as a result of the second equalization, be restored to a condition that existed before the second four-bit symbol was transmitted to optical receiver 250.

As still further shown in FIG. 7, process 700 may include creating a recovered four-bit symbol based on the delayed first pair of bits and the delayed second pair of bits (block 745). For example, optical receiver 250 may associate the delayed first pair of bits and the delayed second pair of bits to create a recovered four-bit symbol (e.g., XId, XQd, YId, and YQd). The recovered four-bit symbol may correspond to the four-bit symbol that was generated by optical transmitter 210 prior to the third bit and the fourth bit associated with the second polarization.

As also shown in FIG. 7, process 700 may include decoding the recovered four-bit symbol to create a three-bit symbol (block 740) and outputting the three-bit symbol (block 745). For example, optical receiver 250 (e.g., decoder 280) may identify a three-bit symbol that corresponds to the bits associated with the recovered four-bit symbol. Optical receiver 250 may, for example, identify a four-bit pattern (e.g., based on a set of four values), within a data structure (e.g., fields 310-325 of data structure 300 of FIG. 3) stored within a memory associated with optical receiver 250, that matches the recovered four-bit symbol. Optical receiver 250 may also, or alternatively, identify a three-bit pattern (e.g., based on a set of three values), within the data structure (e.g., field 305 of data structure 300), that corresponds to the four-bit pattern. Optical receiver 250 may, based on the three-bit pattern, generate a three-bit symbol. In one example, the three-bit symbol may correspond to a 3QAM symbol. Optical receiver 250 may output the three-bit symbol.

A system and/or method, described herein, may enable 3QAM traffic to be processed by a coherent optical system that normally handles PM-QPSK traffic. Enabling the coherent optical system to process the 3QAM traffic may permit the coherent optical system to continue to process traffic when sufficient system margin is not available to process PM-QPSK traffic. Additionally, or alternatively, processing the 3QAM traffic may permit the coherent optical system to continue to process the traffic at a higher throughput than when processing PM-BPSK traffic.

The foregoing description provides illustration and description, but is not intended to be exhaustive or to limit the implementations to the precise form disclosed. Modifications and variations are possible in light of the above teachings or may be acquired from practice of the implementations.

For example, while series of blocks have been described with regard to FIGS. 6 and 7, the order of the blocks may be changed in other implementations. Also, non-dependent blocks may be performed in parallel.

Furthermore, while the disclosed embodiments have been presented as generally suitable for use in an optical network, the systems and methods disclosed herein are suitable for any fiber optic network, fiber network, fiber line, or link that includes one or more transmission spans, amplifier spans, or hops.

Even though particular combinations of features are recited in the claims and/or disclosed in the specification, these combinations are not intended to limit the disclosure of the implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A method comprising:
   receiving, by a receiver device, traffic associated with a three-bit phase modulation scheme, the traffic including a plurality of four-bit symbols, the plurality of four-bit symbols being encoded using a four-bit phase modulation scheme;
   obtaining, by the receiver device and from the traffic, a first symbol of the plurality of four-bit symbols, the first symbol including at least a first pair of bits, the first pair of bits corresponding to a first polarization;
   performing, by the receiver device, a first equalization on the first pair of bits;
   obtaining, by the receiver device and from the traffic, a second symbol of the plurality of four-bit symbols based on performing the first equalization, the second symbol including at least a second pair of bits, the second pair of bits corresponding to a second polarization and being delayed, for a time period, relative to the first pair of bits;
   performing, by the receiver device and after at least the time period from when the first equalization is initiated, a second equalization on the second pair of bits, the second equalization restoring the second pair of bits to a condition that existed before the second pair of bits were transmitted to the receiver device;
   identifying, by the receiver device, a three-bit symbol that corresponds to the equalized first pair of bits and the equalized second pair of bits, the three-bit symbol corresponding to the three-bit phase modulation scheme; and
   outputting, by the receiver device, the three-bit symbol.

2. The method of claim 1, where the three-bit phase modulation scheme corresponds to a three-quadrature amplitude modulation (3QAM) scheme, and
   where the four-bit phase modulation scheme corresponds to a polarization multiplexed-quadrature phase shift keying (PM-QPSK) modulation scheme.

3. The method of claim 1, where each of the plurality of four-bit symbols include:
   a first bit, associated with an in-phase component, that corresponds to the first polarization,
   a second bit, associated with a quadrature component, that corresponds to the first polarization,
   a third bit, associated with the in-phase component, that corresponds to the second polarization, and
   a fourth bit, associated with the quadrature component, that corresponds to the second polarization.

4. The method of claim 1, where the traffic is received via an optical fiber, and
   where the method further includes:
   determining a manner in which noise or imperfections, associated with the optical fiber, degrade the first pair of bits;
   generating a set of values, with which to perform the first equalization, based on the manner in which the noise or the imperfections, associated with the optical fiber, degrade the first pair of bits; and
   performing the first equalization, using the set of values, to restore the first set of bits to a condition that existed before the first set of bits were transmitted, to the receiver device, via the optical fiber.

5. The method of claim 4, where determining the manner in which noise or imperfections degrade the plurality of symbols further includes:
   identifying a first polarization angle of the first pair of bits and a second polarization angle of a third pair of bits, on which equalization has been performed, the equalization on the third pair of bits being performed using the set of values;
   determining a difference between the first polarization angle and the second polarization angle; and
   performing the first equalization, on the first pair of bits, using the set of values when the difference between the first polarization angle and the second polarization angle is less than a threshold.

6. The method of claim 5, further comprising:
   generating a different set of values when the difference between the first polarization angle and the second polarization angle is not less than the threshold; and
   performing the first equalization, on the first pair of bits, using the different set of values.

7. The method of claim 1, where performing the second equalization after the time period from when the first equalization is initiated ensures that the second equalization, on the second pair of bits, is not performed during a period of time that the first equalization is being performed on the first pair of bits.

8. The method of claim 1, where identifying the three-bit symbol further includes:
identifying a first set of four values, stored within a data structure, that matches a second set of four values that corresponds to the equalized first pair of bits and the equalized second pair of bits;
identifying a set of three values, stored within the data structure, that corresponds to the first set of four values;
generating, the three-bit symbol based on the set of three values; and
outputting the three-bit symbol based on generating the three bit symbol.

9. A system comprising:
an equalizer device to:
receive four-bit symbols, the four-bit symbols corresponding to traffic associated with a three-quadrature amplitude modulation (3QAM) scheme and being encoded based on a polarization multiplexed-quadrature phase shift keying (PM-QPSK) modulation scheme;
perform, based on receiving the four-bit symbols, a first equalization on a first symbol, of the four-bit symbols, the first symbol including at least a first pair of bits, the first pair of bits corresponding to a first polarization,
perform, after at least a first time period from when the first equalization is initiated, a second equalization on a second symbol, of the four-bit symbols, the first time period being greater than a second time period during which the first initialization is performed, and the second symbol including at least a second pair of bits, the second pair of bits corresponding to a second polarization, and
output the equalized first pair of bits and the equalized second pair of bits; and
a decoder device to:
receive the equalized first pair of bits and the equalized second pair of bits,
identify a three-bit symbol, of a set of three-bit symbols, that corresponds to a third symbol, of a set of four-bit symbols, the third symbol corresponding to the equalized first pair of bits and the equalized second pair of bits,
the set of three-bit symbols corresponding to the 3QAM scheme, and
the set of four-bit symbols corresponding to the PM-QPSK modulation scheme,
generate the identified three-bit symbol, and
output the generated three-bit symbol.

10. The system of claim 9, further comprising:
a delay device to:
receive the equalized first pair of bits,
store the equalized first pair of bits, and
output, to the decoder, the equalized first pair of bits after at least a third time period during which the second equalization is performed, the outputting the equalized first pair of bits, after at least the third time period, causing the first pair of bits and the second pair of bits to be received by the decoder at approximately a same point in time.

11. The system of claim 9, where the first time period corresponds to a quantity of clock cycles, associated with the system, that is greater than a span of the equalizer device, the span of the equalizer device corresponding to a quantity of four-bit symbols being processed or stored, by the equalizer device, at a point in time.

12. The system of claim 9, further comprising:
a transmitter device to:
receive a three-bit symbol associated with the 3QAM scheme,
identify a third symbol, of a set of four-bit symbols, that corresponds to the received three-bit symbol, the set of four-bit symbols corresponding to the PM-QPSK modulation scheme, and
generate the third symbol.

13. The system of claim 12, where the transmitter is further to:
identify, based on the third symbol, the first pair of bits and the second pair of bits,
store the second pair of bits in a memory associated with the system,
associate the first pair of bits with a third pair of bits to create the first symbol, the third pair of bits corresponding to the second polarization, and
output the first symbol based on associating the first pair of bits with the third pair of bits.

14. The system of claim 13, where the transmitter is further to:
retrieve, from the memory and after the first time period, the second pair of bits,
associate the second pair of bits with a fourth pair of bits to create the second symbol, the fourth pair of bits corresponding to the first polarization, and
output the second symbol.

15. A receiver device comprising:
one or more processors to:
receive four-bit symbols, the four-bit symbols corresponding to traffic associated with a three-bit phase modulation scheme and being encoded based on a four-bit phase modulation scheme,
determine, based on receiving the four-bit symbols, one or more values with which to perform equalization that enable the four-bit symbols to be restored to a condition that existed prior to being transmitted to the receiver device,
perform, using the one or more values, a first equalization on a first symbol, of the four-bit symbols, the first symbol including at least a first pair of bits associated with a first polarization,
perform, after completing the first equalization on the first symbol, a second equalization on a second symbol, of the four-bit symbols, the second symbol including at least a pair of second bits associated with a second polarization,
identify a three-bit symbol, of a set of three-bit symbols, that corresponds to a third symbol, of a set of four-bit symbols, the third symbol corresponding to the equalized first pair of bits and the equalized second pair of bits,
the set of three-bit symbols corresponding to the three-bit phase modulation scheme, and
the set of four-bit symbols corresponding to the four-bit phase modulation scheme,
generate the identified three-bit symbol, and
output the generated three-bit symbol.

16. The receiver device of claim 15, where, when determining the one or more values, the one or more processors are further to:
identify an error rate associated with a third symbol, of the four-bit symbols, on which a third equalization was performed using one or more first values, the one or more first values being based on a quantity of noise or imperfections associated with an optical fiber via which, the third symbol is transmitted to the receiver device, and
perform the first equalization using the one or more first values when the error rate is less than a threshold.

17. The receiver device of claim 16, where the one or more processors are further to:
generate one or more second values when the error rate is not less than the threshold, and
perform the first equalization using the one or more second values, the one or more second values being different than the one or more first values.

18. The receiver device of claim 17, where the one or more processors are further to:
identify a particular error rate associated with the first symbol on which the first equalization was performed using the one or more first values or the one or more second values, and
perform the second equalization using at least one of:
the one or more first values or the one or more second values when the particular error rate is less than the threshold, or
one or more third values when the particular error rate is not less than the threshold, the one or more third values being based on another quantity of noise or imperfections associated with the optical fiber via which the first symbol is transmitted to the receiver device.

19. The receiver device of claim 15, where the second pair of bits are delayed, relative to the first pair of bits, for a first time period, the first time period being greater than an amount of time to perform the first equalization, and
where the one or more processors are further to:
temporarily store, in a memory associated with the receiver device, the equalized first pair of bits,
retrieve, from the memory and after the first period of time, the first pair of equalized bits, and
identify the three-bit symbol based on the retrieved equalized first pair of bits and the equalized second pair of bits.

20. The receiver device of claim 15, where the second pair of bits are delayed, relative to the first pair of bits, for a first time period, the first time period being greater than an amount of time to perform the first equalization, and
where the first pair of bits and the second pair of bits are generated from a same three-bit symbol, associated with the three-bit phase modulation scheme, prior to:
the second pair of bits being delayed relative to the first pair of bits by the first time period, and
the first symbol and the second symbol being transmitted to the receiver device.

21. An optical transmitter, comprising:
one or more processors to:
receive a three-bit symbol associated with a three-bit phase modulation scheme,
identify, based on receiving the three-bit symbol, a first four-bit symbol, of a set of four-bit symbols, that corresponds to the three-bit symbol, the set of four-bit symbols corresponding to a four-bit phase modulation scheme,
generate the first four-bit symbol that corresponds to the three-bit symbol;
identify, based on the first four-bit symbol, a first pair of bits and a second pair of bits, the first pair of bits corresponding to a first polarization and the second pair of bits corresponding to a second polarization,
associate the first pair of bits with a third pair of bits to create a second four-bit symbol that corresponds to the four-bit phase modulation scheme, the third pair of bits corresponding to the second polarization,
output the second four-bit symbol,
associate, based on outputting the second four-bit symbol and after a time period from when the first pair of bits are associated with the third pair of bits, the second pair of bits with a fourth pair of bits to create a third four-bit symbol that corresponds to the four-bit phase modulation scheme,
the fourth pair of bits corresponding to the first polarization, and
output the third four-bit symbol.

22. The optical transmitter of claim 21, where outputting the third four-bit symbols occurs after outputting the second four-bit symbol by at least the time period, at least the time period enabling a receiver, that receives the second four-bit symbol and the third four-bit symbol, to initiate a first equalization, on the second pair of bits, after a second equalization, on the first pair of bits, is completed.

23. The optical transmitter of claim 22, where at least the time period corresponds to another time period that the receiver delays the equalized first pair of bits, on which the second equalization was performed, relative to the equalized second pair of bits on which the first equalization was performed.

24. An optical receiver, comprising:
one or more components to:
receive traffic that includes four-bit symbols, the four-bit symbols being encoded using a four-bit phase modulation scheme,
process the traffic to recover the four-bit symbols, the recovered four-bit symbols being restored to a condition that existed before the four-bit symbols were transmitted to the optical receiver device,
decode the recovered four-bit symbol to obtain three-bit symbols, the three-bit symbols being associated with a three-quadrature amplitude modulation (3QAM) scheme, and
output the traffic based on the three-bit symbols,
where, when processing the traffic to recover the four-bit symbols, the one or more components are further to:
perform a first equalization on a first symbol, of the four-bit symbols, the first symbol including at least a first pair of bits associated with a first polarization, and
perform, after completing the first equalization, a second equalization on a second symbol, of the four-bit symbols, the second symbol including at least a second pair of bits associated with a second polarization, the second polarization being different than the first polarization.

25. The optical receiver device of claim 24, where the one or more components are further to:
delay the equalized first pair of bits to cause the equalized first pair of bits and the equalized second pair of bits to be synchronized with respect to time,
create a third four-bit symbol based on the equalized first pair of bits and equalized second pair of bits that are synchronized with respect to time,
decode the third four-bit symbol to create a three-bit symbol, of the three-bit symbols associated with the 3QAM scheme, and
output the three-bit symbol.

* * * * *